United States Patent [19]
Richards

[11] Patent Number: 5,259,765
[45] Date of Patent: Nov. 9, 1993

[54] BIOFIDELIC MANIKIN NECK

[75] Inventor: Marvin K. Richards, Chandler, Ariz.

[73] Assignee: Simula Inc., Phoenix, Ariz.

[21] Appl. No.: 960,979

[22] Filed: Oct. 14, 1992

Related U.S. Application Data

[63] Continuation-in-part of Ser. No. 718,579, Jun. 21, 1991, Pat. No. 5,152,692.

[51] Int. Cl.⁵ .............................................. G09B 23/28
[52] U.S. Cl. .................................. 434/274; 434/267; 434/270; 446/384; 73/866.4
[58] Field of Search ............... 434/262, 267, 270, 274; 446/382, 383, 384; 73/866.4

[56] References Cited

U.S. PATENT DOCUMENTS

4,773,865 9/1988 Baldwin ............................. 434/274

Primary Examiner—Gene Mancene
Assistant Examiner—L. Thomas
Attorney, Agent, or Firm—Kirkland & Ellis

[57] ABSTRACT

The present invention is a biofidelic manikin neck comprising a butyl rubber beam inserted between an aluminum base and an aluminum top, with a stainless steel cable assembly in the middle of the beam connecting the top to the base. In a first preferred embodiment of the present invention, a pivot joint is bolted to a lug in the neck top. The joint is attached to a head mounting plate to provide head nodding action. An outer cylinder, comprised of a thick sheet of butyl rubber attached vertically around the head mounting plate and the neck base, allows the head moment to respond to the angle between the head and the torso. A second preferred embodiment of the present invention uses a torsion release swivel joint instead of a pivot joint, and uses additional strips of butyl rubber to stiffen the neck response. A third preferred embodiment uses a rectangular inner beam, and a roughly oval-shaped outer support structure. A fourth preferred embodiment uses a modified rectangular beam without any additional outer support structures, and a lateral pivot joint in addition to a torsion release swivel joint.

22 Claims, 11 Drawing Sheets

BIOFIDELIC MANIKIN NECK

This application is a continuation-in-part of application Ser. No. 07/718,579 filed Jun. 21, 1991, U.S. Pat. No. 5,152,692.

FIELD OF THE INVENTION

This invention relates broadly to apparatus for protecting occupants of vehicles in crashes or in sudden positive or negative accelerations. More specifically, it relates to anthropomorphic dummies or manikins intended to simulate human occupants in testing for the effectiveness of protective equipment.

BACKGROUND OF THE INVENTION

The development of dummies is discussed in U.S. Army Report USARTL-TR-79-22B, AIRCRAFT CRASH SURVIVAL DESIGN GUIDE, Volume II, Applied Technology Laboratory, U.S. Army Research and Technology Laboratories (AVARADCOM), Fort Eustis, Va. 23604 (980). This report is expressly incorporated by reference herein. One of the earliest dummy designs was a rugged ejection seat dummy built by Sierra Engineering Company for the Air Force in 1949. This dummy had limited articulation and poor biomechanical fidelity, but it was used by aircraft system manufacturers, and by automobile manufacturers. Another early dummy was designed and built by Swearingen. This was a 120-lb dummy with articulated principal joints, a realistic distribution of body weight, and a center of gravity approximating that of the human body. This dummy was used to evaluate the effect of an explosive decompression of an aircraft cabin as a result of a window failure. In 1951 Swearingen completed an improved dummy, capable of withstanding accelerations of 35 to 50 G. This dummy was used in evaluating a new safety harness for aircraft. In 1954 Alderson Research Laboratories, Inc. created the first mass production dummy, unique for its modular design, which permitted new parts to be added as needs changed. By 1967 dummy manufacturers achieved some improvement in biomechanical response with increased articulation in the vertebral column and shoulders and increased chest compliance. In 1968 the Society of Automotive Engineers ("SAE") Recommended Practice J963 defined the first standard dummy, a 50th-percentile male anthropomorphic test dummy with specified weights, center-of-gravity locations, dimensions for body segments, and ranges of motion for body joints.

In 1971 the National Highway Traffic Safety Administration formally changed the role of dummies from that of determining the relative performance of similar safety systems to that of an absolute measuring instrument for determining the potential for injury to human occupants in an automobile crash. In 1972 General Motors Corporation produced a 50th-percentile male anthropomorphic test dummy. The design of the Hybrid II was based on the torso and limbs of an advanced Alderson dummy (Model No. VIP-50A), with modifications to the chest to allow damping and increased deflection of the chest. The head assembly was adapted from a Sierra design (Model No. 292-1050) with several anatomical modifications. The neck and the lumbar spine are butyl rubber cylinders, with an internal steel cable reinforcing the spine. With further modifications, the Hybrid II dummy was the basis for the standards in the Code of Federal Regulations, Title 49, Part 572. These standards included the dimensions and inertial properties of the dummy.

In 1975 General Motors produced the Hybrid III dummy. This dummy had much improved component biofidelity, especially in the head and neck system, the torso, and in the distribution of the weight in the lower torso. It was also provided with transducers for measuring neck loads and chest deflections. The Hybrid III head is an aluminum skull covered by a vinyl skin.

Figure 1:
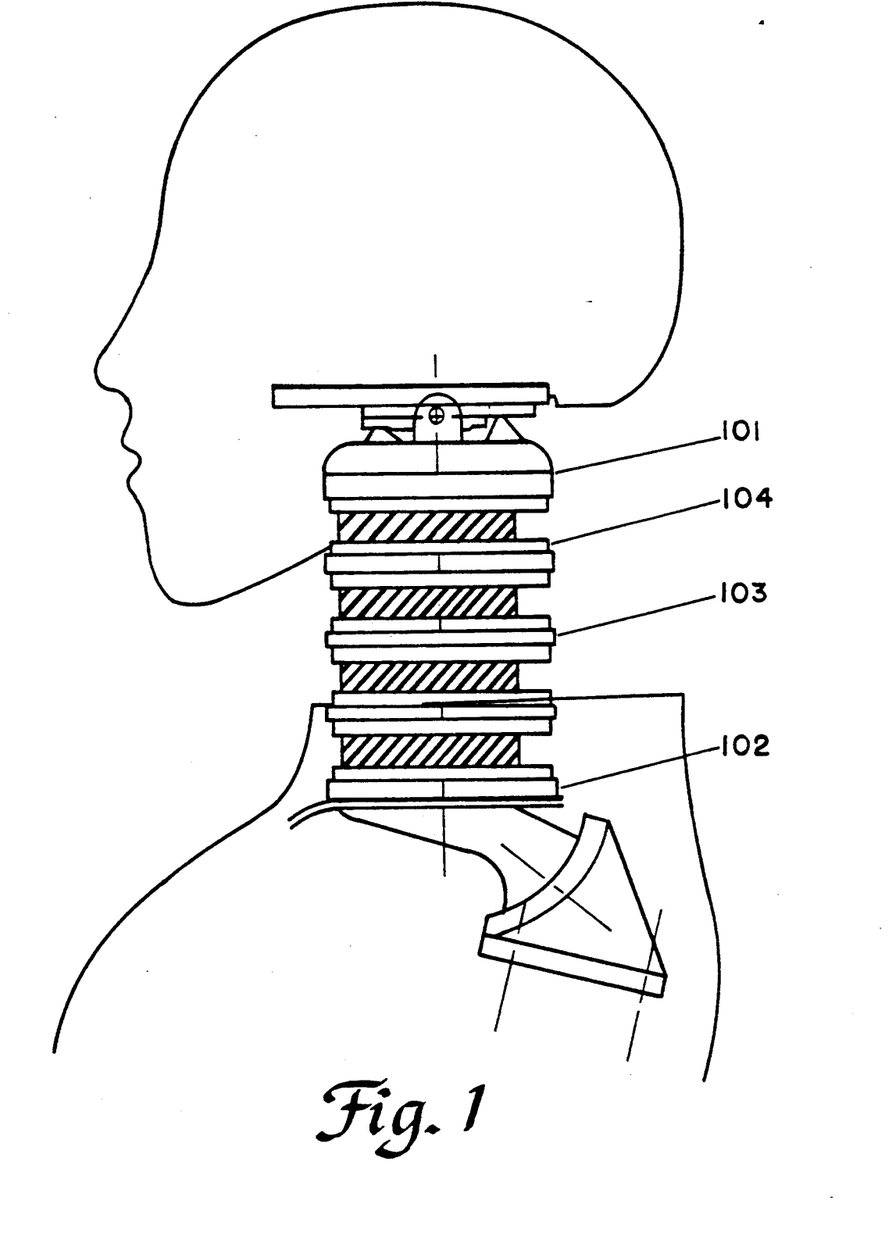
FIG. 1 is a schematic of the Hybrid III neck.

The Hybrid III neck was designed to provide biomechanical response in flexion (the head and neck rotating forward) and in extension (the head and neck rotating backward). The Hybrid III neck consists of three rigid aluminum vertebral elements molded in a butyl elastomer. The Hybrid III neck is shown in FIG. 1. It comprises a top plate 101, a bottom plate 102 and intermediate plates 103 molded in butyl elastomer 104. The elastomer provides the high damping characteristics required to effectively model the human response. Aluminum end plates attach the neck segment to the head and torso. A steel cable runs through the center of the neck.

The foregoing summary of the development of test dummies demonstrates that they have been designed primarily for applications in automobiles. One of the main concerns in automobile crashes is the response of the neck to impacts from the forward and lateral directions. These dummies are not truly adequate for ejection seat testing, because ejection seat dummies are subjected to sudden vertical accelerations as well as to horizontal acceleration.

Anthropomorphic models used in ejection seat testing are commonly referred to as "manikins" instead of dummies, because these models are much more sophisticated representations of the human body. Test manikins have been developed specifically for ejection seat testing by the Armed Services. The Advanced Dynamic Anthropomorphic Manikin (ADAM), described in ADAM—THE PHYSICAL BEING, by Richard P. White, Jr., presented at the 25th Annual SAFE Symposium, Las Vegas, Nev., Nov. 16–19, 1987, retains the Hybrid III neck, and thus has a neck structure with limited biofidelity in its response to vertical and horizontal accelerations.

The Hybrid III neck system cannot faithfully model the motion of the human head, because the Hybrid III neck system is designed so that the moment applied to the head of the Hybrid III manikin is a function of the angle between the head and the neck, instead of being a function of the angle between the head and the torso.

SUMMARY OF THE INVENTION

The present invention is a biofidelic manikin neck that provides more accurate head response to horizontally and vertically applied accelerations than do the Hybrid III and ADAM necks. The present invention can be retrofitted into these and other state-of-the-art manikins used for ejection-seat testing.

The main component of the neck is an elastomeric beam made of butyl rubber of 50–60 durometer (e.g., Unirubber P/N MR125) inserted between an aluminum neck base and an aluminum neck top. The neck top and neck base are connected by a stainless steel cable assembly inserted in a vertical hole in the beam and attached to the neck top and the neck base. The cable provides axial strength, increases durability, and limits stretching. The neck top is connected to a plate for mounting the head with a joint that allows for head motion.

In a first embodiment of the present invention, the elastomeric beam is a cylinder. For proper positioning of the neck with respect to the torso, the beam is located forward of the center of the neck base. Also, for proper positioning of the neck with respect to the head, the top of the circular head mounting plate slopes downward from front to back. The head mounting plate is attached to the neck by a lateral pivot joint so that the head may pivot backward and forward. The head mounting plate is also supported by an outer cylinder formed from a ⅛-inch thick sheet of butyl rubber. The butyl rubber sheet is bonded to the head mounting plate and the neck base. The outer cylinder thus holds the head mounting plate in place and effectively connects the head to the torso, allowing the moment of the head to be a function of the angle between the head and the torso. The resistance of the neck to flexion can readily be modified by changing the thickness of the rubber sheet. For example, a ⅛-inch-thick rubber sheet could be added all around the neck, or only to portions of the neck.

In a second embodiment of the present invention, the elastomeric beam is a modified cylinder and the lateral pivot joint is replaced by a torsional swivel joint. Additional strips of butyl rubber can be added externally to the outer support structure to provide additional neck stiffness.

A third embodiment of the present invention is similar to the second embodiment, but the elastomeric beam is of a rectangular configuration and the cross-section of the outer support structure is roughly oval.

In a fourth embodiment of the present invention, the elastomeric beam has a roughly rectangular block configuration. Channels cut through the elastomeric beam help provide the desired neck response. The head support plate is connected to the neck by a torsional swivel joint in the front and a lateral pivot joint in the rear. The outer support structure of the previous embodiments has been eliminated. This fourth embodiment provides improved neck response over the first, second and third embodiments.

It is an object of the present invention to provide a biofidelic manikin neck that faithfully reproduces human-like responses in ejection and crash tests so that researchers may be able to identify and eliminate the causes of head and neck injuries.

It is an additional object of the present invention to provide an improved neck that will retrofit into existing anthropomorphic test dummies used in both automobile and aircraft safety tests.

These and other objects of the present invention are described in greater detail in the detailed description of the invention, the appended drawings and the attached claims.

DETAILED DESCRIPTION OF PREFERRED EMBODIMENTS OF THE INVENTION

Figure 2:
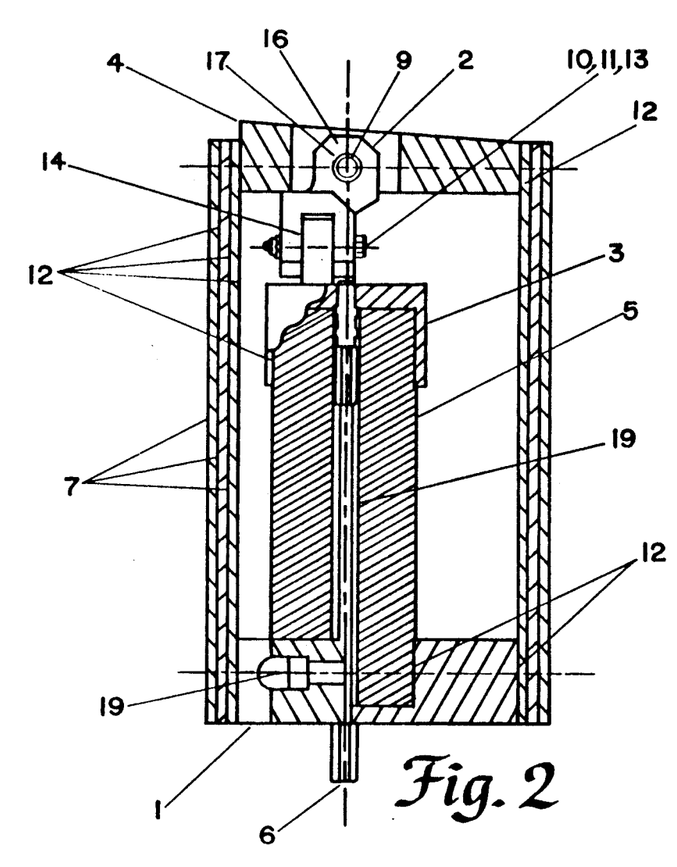
FIG. 2 shows a partial cross-sectional representation of the biofidelic manikin neck assembly of a first preferred embodiment.
Figure 3A:
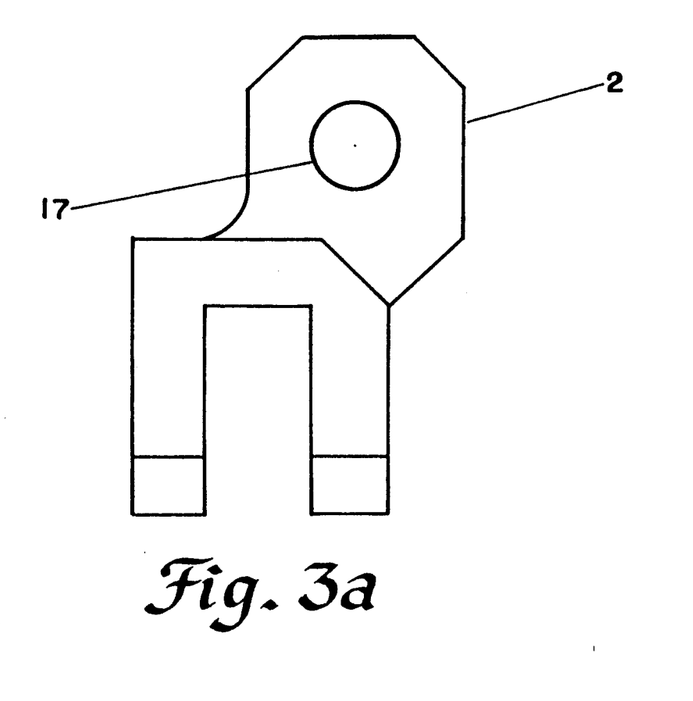
FIG. 3a is a side view of the pivot joint of the first preferred embodiment.
Figure 3B:
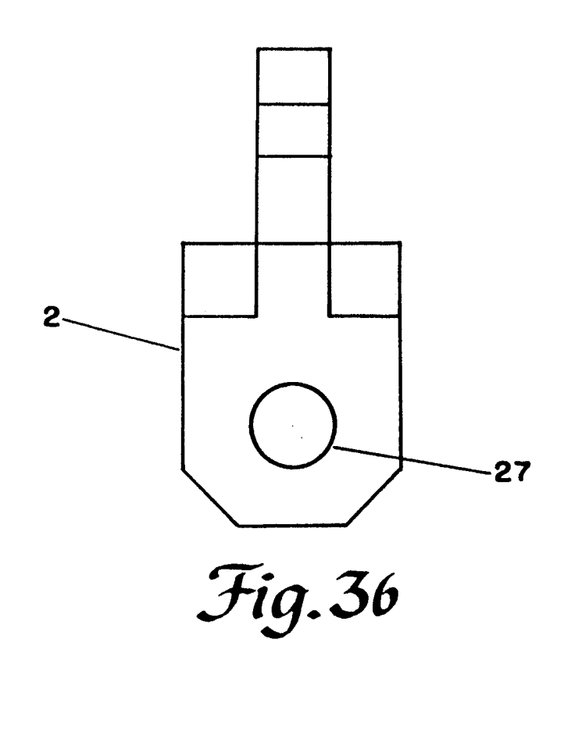
FIG. 3b is a back view of the pivot joint of the first preferred embodiment.
Figures 4A, 4B:
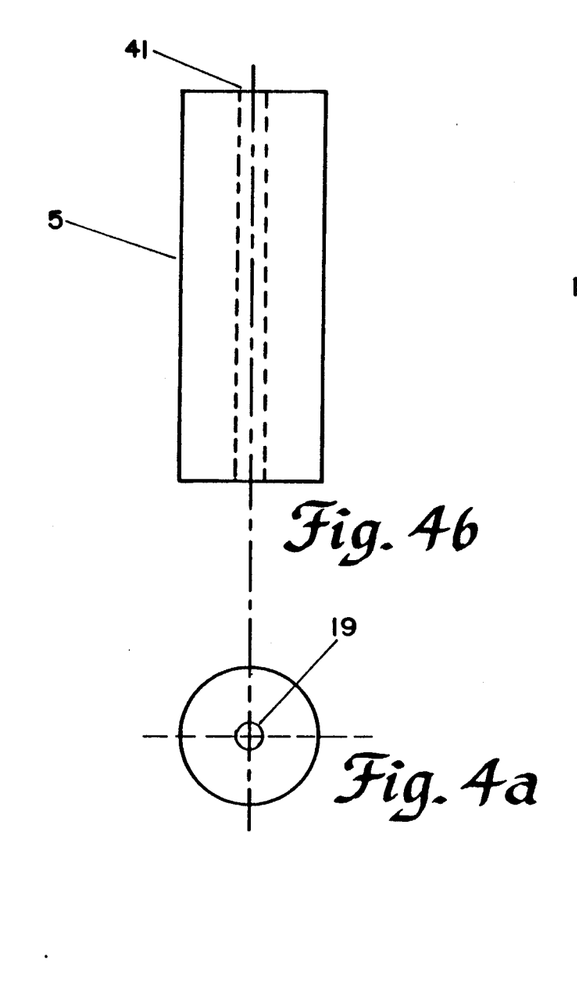
FIG. 4a is a top view of the butyl rubber beam of FIG. 2.
FIG. 4b is a side view of the butyl rubber beam of FIG. 2.

A first preferred embodiment of the present invention is shown in FIG. 2. As shown in FIG. 2, the biofidelic manikin neck assembly comprises an elastomeric beam 5 made of commercial grade 50-60 durometer butyl rubber inserted between 6061-T6 aluminum neck base assembly 1 and 6061-T6 aluminum neck top 3. FIGS. 4a and 4b show that elastomeric beam 5 is a cylinder with a through hole 41 down its center. Neck base 1 is shown in greater detail in FIGS. 5a-5b. For ease of assembly, neck base 1 is produced in two parts, a smaller part 22 and a larger part 23. Neck top 3 includes lug 14 for connection to pivot joint 2. Pivot joint 2 is shown in detail in FIGS. 3a and 3b. Bolt 10 is used to attach pivot joint 2 to lug 14. Pivot joint 2 is inserted into slot 15 in 6061-T6 aluminum head mounting plate 4 and held in place by pin 9. Some forward and backward motion is provided at the top of the neck by allowing the head mounting plate to rotate about pin 9. Some side-to-side motion is provided at the top of the neck by allowing pivot joint 2 to rotate about bolt 10. Neck top 3 and head mounting plate 4 are shown in greater detail in FIGS. 6a–6c and 7a–7c.

Stainless steel cable assembly 6 is inserted in vertical hole 41 in the middle of beam 5 (see FIG. 4a), hole 21 in neck base 1 (see FIG. 5a), and corresponding hole 20 in neck top 3 (see FIG. 6a), to connect neck base 1 to neck top 3 and hold beam 5 in place. Cable assembly 6 is threaded into neck top 3, and held between parts 22 and 23 of neck base 1. Cable assembly 6 provides axial strength, increases durability, and limits stretching.

FIG. 2 also shows neck outer cylinder 7, which is formed from three layers of, for example, ⅛" thick commercial grade 50–60 durometer butyl rubber bonded vertically and completely around neck base 1 and head mounting plate 4. The sheets of butyl rubber are bonded to each other with a adhesive 12. Adhesive 12 is a rubber cement, such as Bostik Boscodur 2-part adhesive, Bostik P/N ADH7132. Adhesive 12 is also used to bond outer cylinder 7 to head mounting plate 4 and to base plate 1, and to bond elastomeric beam 5 to neck top 3 and base plate 1. Outer cylinder 7 could also be formed from a single layer of butyl rubber. Internal resistance to flexion can be modified by changing the thickness of outer cylinder 7 (e.g., thicknesses ranging from ⅛" to ⅜"), or by adding additional sheets to portions of the outer cylinder to stiffen the neck response in certain directions.

Figure 5A:
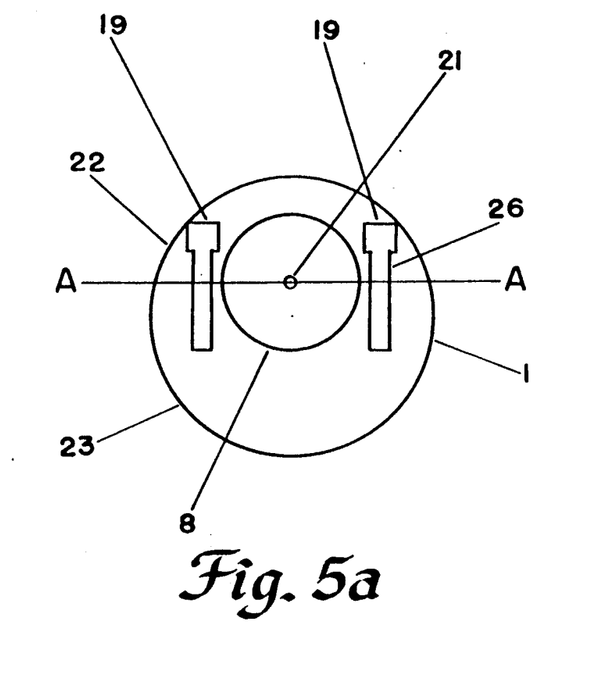
FIG. 5a is a top view of the aluminum neck base of FIG. 2.
Figure 5B:
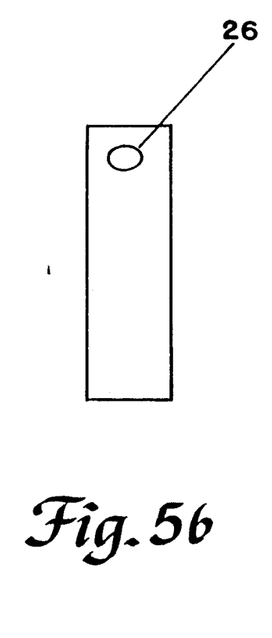
FIG. 5b is a side view of the aluminum neck base of FIG. 2.
Figure 5C:
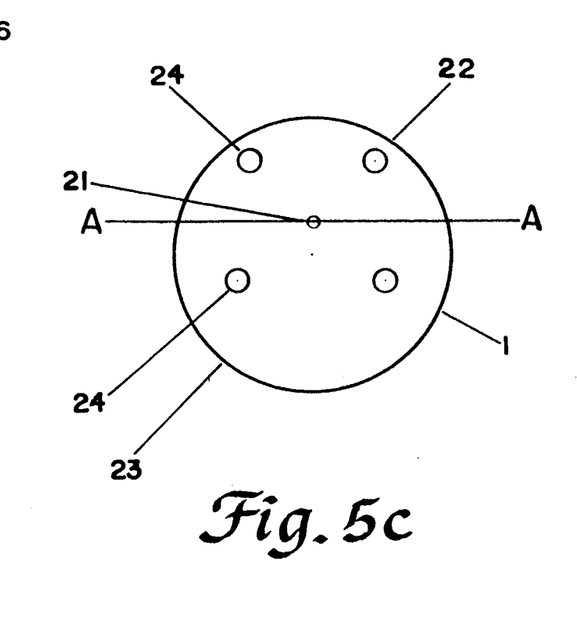
FIG. 5c is a bottom view of the aluminum neck base of FIG. 2.

FIGS. 5a, 5b and 5c show neck base assembly 1. Four threaded holes 24 in the bottom of neck base 1 permit attachment of the neck to the manikin torso (not shown). Line A—A in FIGS. 5a and 5c is the boundary between part 22 and part 23 of neck base 1. The two parts are held together by two internal-wrenching threaded bolts 19 inserted in threaded holes 26, as shown in FIG. 5a. For proper positioning of the neck with respect to the torso, beam 5 is located forward of the center of the circular base 1. Butyl rubber beam 5 is held in position by circular indentation 8, shown in FIG. 5a. Circular indentation 8 is centered on hole 21.

Figure 6A:
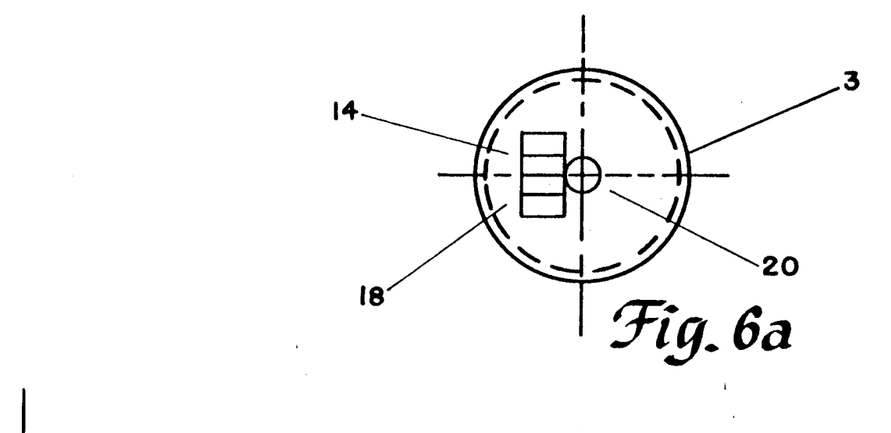
FIG. 6a is a top view of the aluminum neck top of FIG. 2.
Figure 6B:
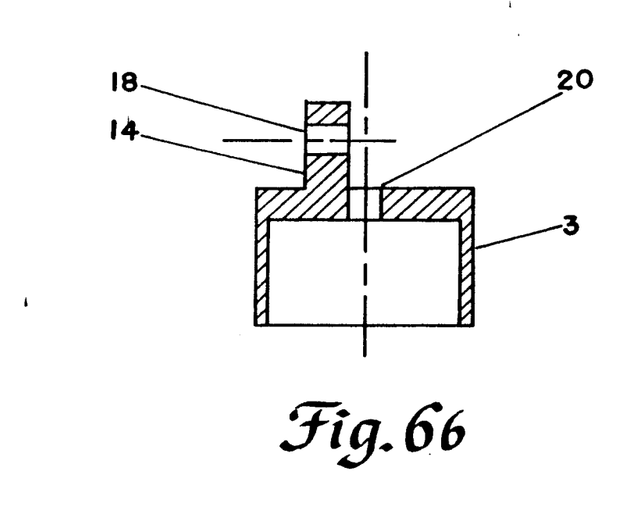
FIG. 6b is a cross-sectional view of the aluminum neck top of FIG. 2.
Figure 6C:
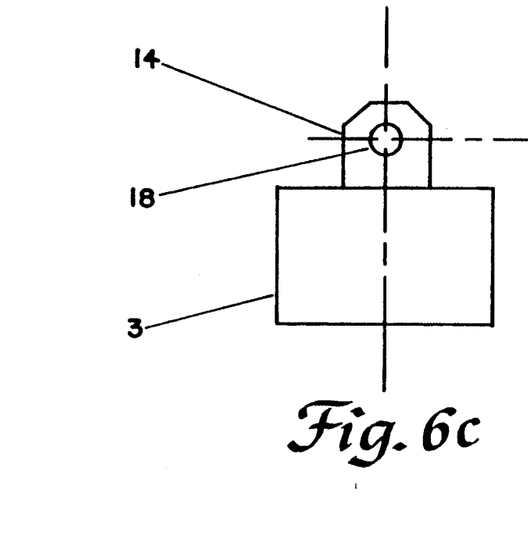
FIG. 6c is a side view of the aluminum neck top of FIG. 2.
Figures 7A, 7B:
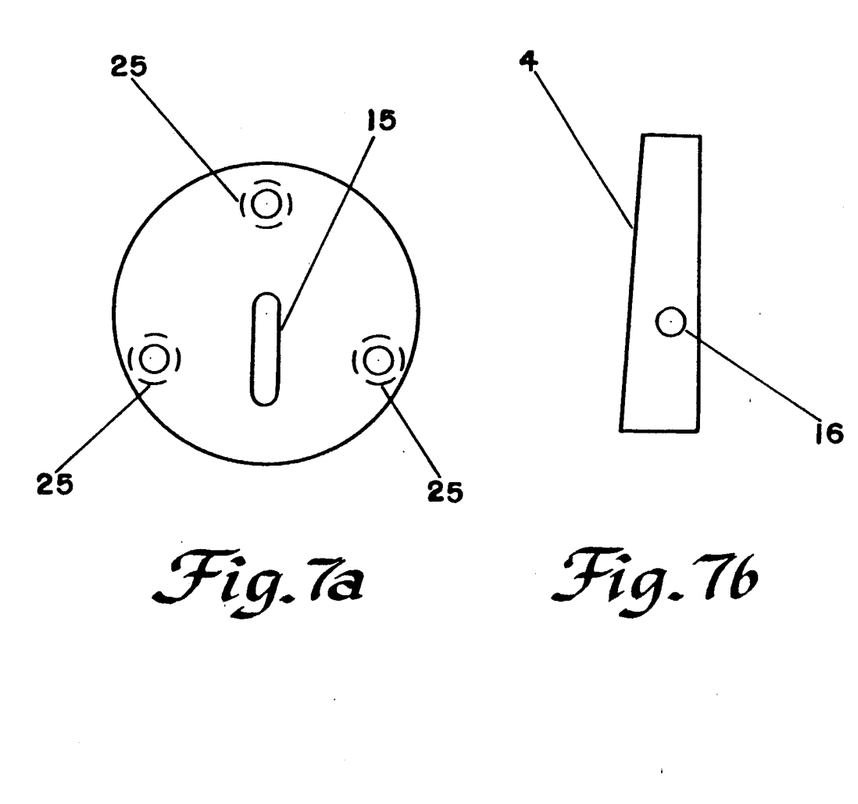
FIG. 7a is a top view of the aluminum head mounting plate of FIG. 2.
FIG. 7b is a side view of the aluminum head mounting plate of FIG. 2.
Figure 7C:
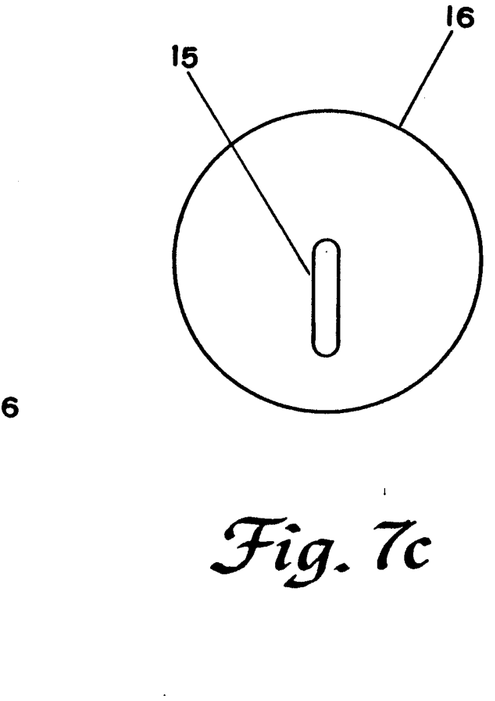
FIG. 7c is a bottom view of the aluminum head mounting plate of FIG. 2.

FIGS. 6a, 6b and 6c show aluminum neck top 3. These figures show the location of hole 20 in neck top 3, and the position of lug 14 in front of hole 20. Bolt 10 is inserted in hole 18 in lug 14 and holes 27 in pivot joint 2 (shown in FIG. 3b) to attach pivot joint 2 to lug 14. Pivot joint 2 is inserted in slot 15 in head mounting plate 4, and secured to head mounting plate 4 by inserting pin 9 through hole 16 in head mounting plate 4 and hole 17 in pivot joint 2. FIGS. 7a, 7b and 7c show head mounting plate 4. FIGS. 7a–7c show the locations of threaded holes 25 and slot 15 in head mounting plate 4. Holes 25 are used to attach the head (not shown) to the neck. FIG. 7b shows the top of head mounting plate 4 sloping down from the front to the back.

FIGS. 7b and 7c show the location of hole 16. Pin 9 passes through hole 16 in head mounting plate 4 from one side of slot 15, through hole 17 in pivot joint 2, and into a continuation of hole 16 on the other side of slot 15. About three-fourths of the way across head mounting plate 4, hole 16 is reduced slightly in diameter to form a stop for pin 9. The smaller-diameter hole 16 continues to the other side of head mounting plate 4, so that pin 9 can be knocked out when necessary for disassembling the neck. FIG. 7c shows the configuration of hole 16 with dashed lines. Pivot joint 2 is attached to lug 14 by inserting a bolt 10 through the U-shaped portion of pivot joint 2 fitting over lug 14. Bolt 10 passes through hole 18 in lug 14 and is secured by washer 13 and lock nut 11. A pin could be used instead of bolt 10, washer 13 and lock nut 11.

Figure 8A:
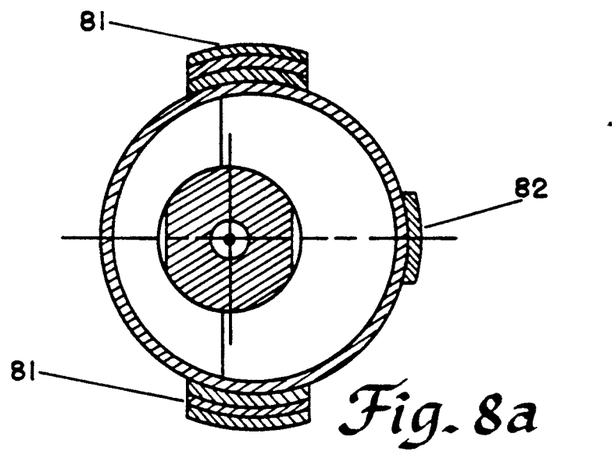
FIG. 8a is a top cross-sectional view of a second preferred embodiment of the present invention.
Figure 8B:
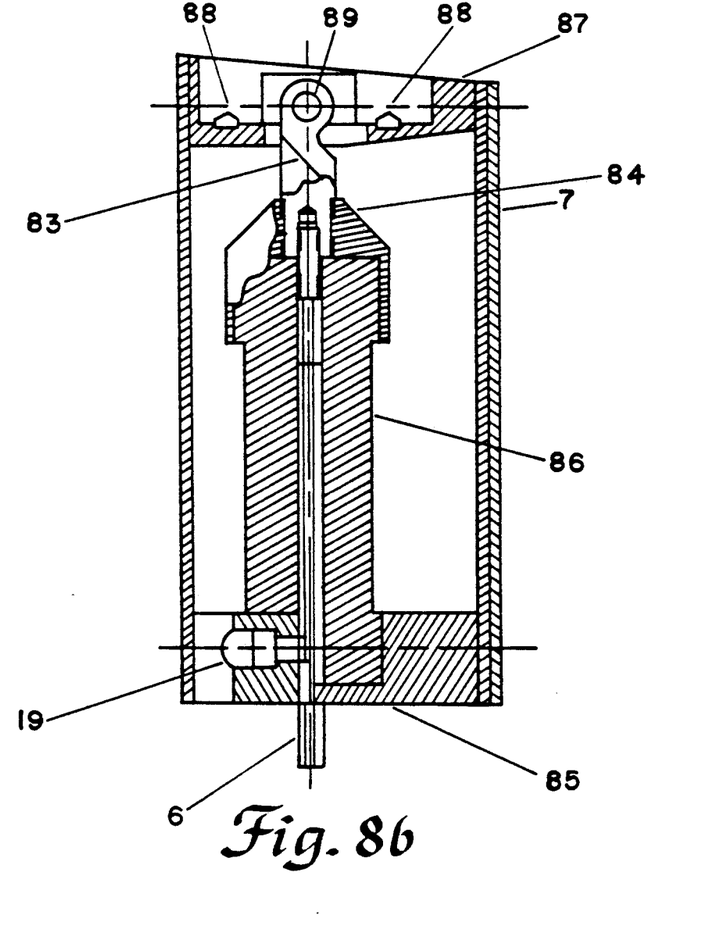
FIG. 8b is a side cross-sectional view of a second preferred embodiment of the present invention.
Figure 8C:
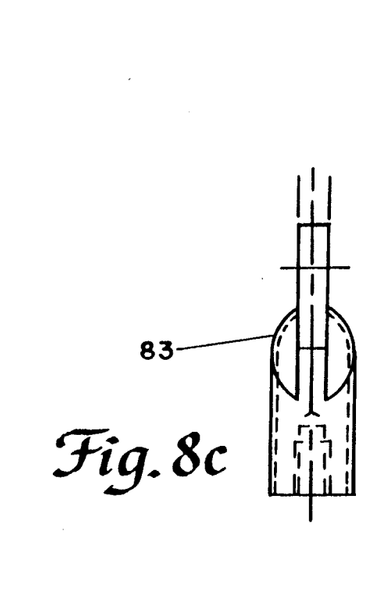
FIG. 8c is a back view of the torsion release swivel joint of the second preferred embodiment.
Figure 8D:
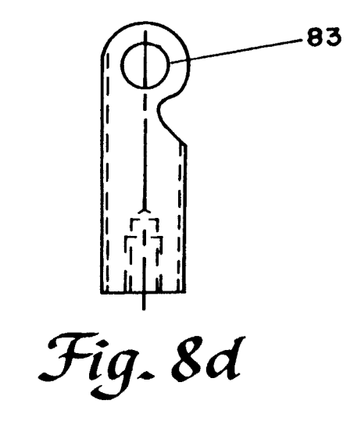
FIG. 8d is a side view of the torsion release swivel joint of the second preferred embodiment.
Figure 8E:
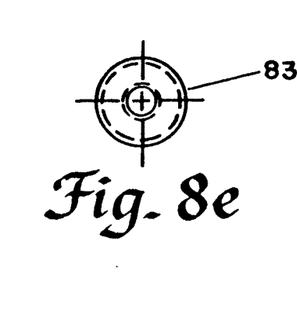
FIG. 8e is a bottom view of the torsion release swivel joint of the second preferred embodiment.
Figure 8F:
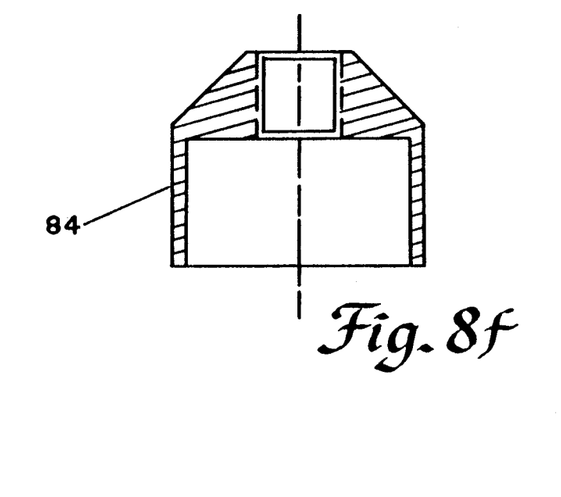
FIG. 8f is a side cross-sectional view of the neck top of the second preferred embodiment.

FIGS. 8a and 8b show a second preferred embodiment of the present invention. FIG. 8a is a top view of the biofidelic neck of the second preferred embodiment, showing lateral stiffeners 81 and aft stiffener 82 attached to outer cylinder 7. Lateral stiffeners 81 are formed from 3 layers of ⅛" thick butyl rubber. Aft stiffener 82 is formed from one ⅛" thick layer of butyl rubber. Torsion release swivel joint 83 is used in the second embodiment, instead of a lateral pivot joint. Torsion release swivel joint 83 is shown in greater detail in FIGS. 8c, 8d and 8e. Torsion release swivel joint 83 is threaded into neck top 84. Neck top 84 is shown in greater detail in FIG. 8f. Head support plate 87 is shown in greater detail in FIGS. 8g, 8h and 8i. Head support plate 87 has been designed to interface with a load cell in the head. The load cell, which was manufactured by the Robert L. Denton Co., measures forces in all three directions and moments about all three axes. Head support plate 87 includes snubbers 88 for positioning the load cell (see FIG. 8b). Snubbers 88 are triangular rods of plastic, which fit into pockets 871 (see FIG. 8g). Clearance pockets 872 are designed to allow clearance for the load cell. When the head support plate 87 is attached to neck top 84, torsion release swivel joint 83 is inserted into slot 873 and projects up above the slot. Lugs 874 project up from head support plate 87, forming a U above slot 873 into which torsion release swivel joint 83 is inserted. Torsion release swivel joint 83 is attached to head support plate 87 by inserting a pin 89 (see FIG. 8b) through holes 876 (see FIG. 8h) in lugs 874 and hole 831 (see FIG. 8d) in torsion release joint 83.

Figures 8G, 8H, 8I:
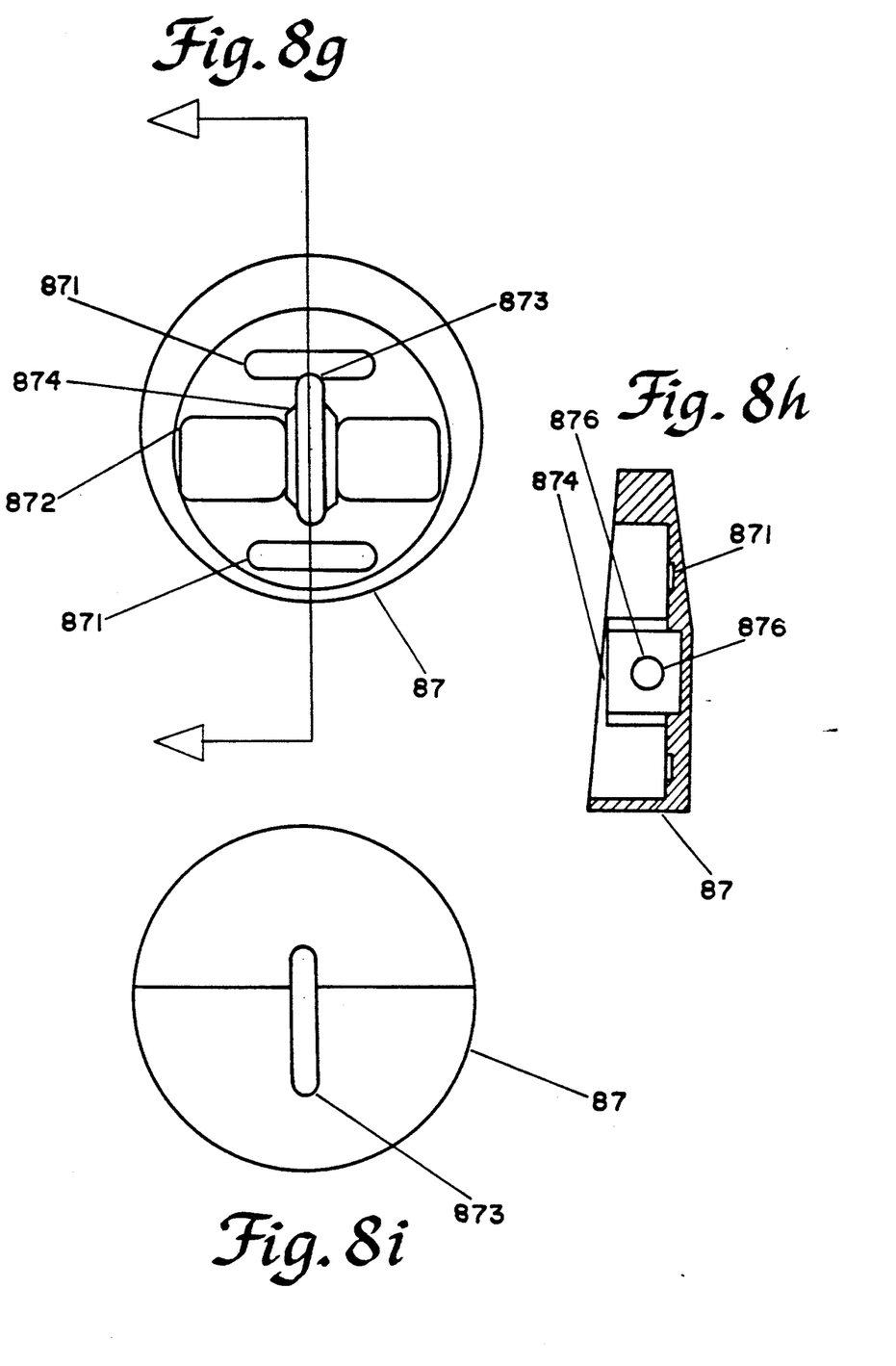
FIG. 8g is a top view of the head support plate of the second preferred embodiment.
FIG. 8h is a side cross-sectional view of the head support plate of the second preferred embodiment, taken along the line indicated by the arrows in FIG. 8g.
FIG. 8i is a bottom view of the head support plate of the second preferred embodiment.

Line 874 in FIG. 8h is continued in FIG. 8i. This line shows the relative position of slot 873 (shown from the bottom in FIG. 8i) and hole 876 (shown in FIG. 8h).

Neck base 85 is similar to neck base 1 of the first preferred embodiment of the present invention. Torsion release swivel joint 83 rotates relative to neck inner beam 86. Neck inner beam 86 differs from the inner beam used in the first preferred embodiment, because it no longer has a uniform diameter. The beam diameter is trimmed on the front and aft surfaces to a final overall front-to-aft thickness of 1.46", from an original outside diameter of 1.70". The lateral thickness of the beam remains at the outside diameter of 1.70". Cable 6 is secured to the neck top by being threaded into the torsion release swivel joint. It is secured to the neck base by being held between the two parts of the neck base.

The use of a torsion release swivel joint instead of a pivot joint prevents the neck inner beam from contributing to the torsional stiffness of the neck. Thus torsional stiffness is only due to the outer structure of the neck, i.e., outer cylinder 7 and stiffeners 81 and 82.

Figure 9A:
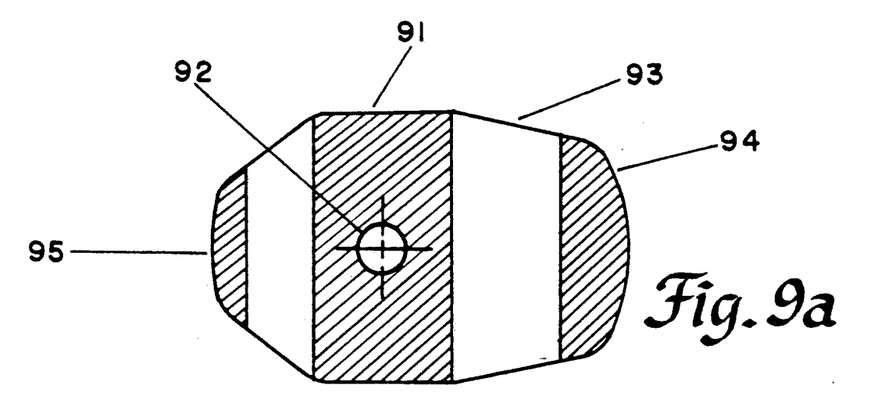
FIG. 9a is a cross-sectional top view of the inner beam and the outer structure of the third preferred embodiment.
Figure 9B:
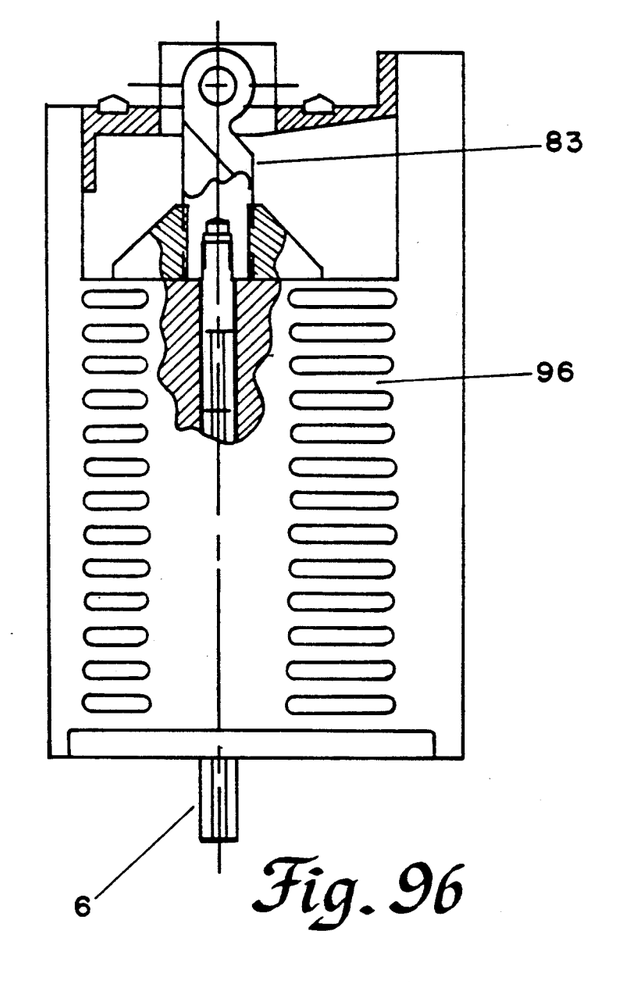
FIG. 9b is a partial cross-sectional lateral representation of the third embodiment.

A third preferred embodiment of the present invention is shown in FIGS. 9a and 9b. The third preferred embodiment is similar to the second embodiment, but the inner beam is rectangular instead of circular, and the outer cylinder is replaced with a non-circular roughly oval outer structure. FIG. 9a is a cross-sectional top view of the inner beam and the outer structure, taken across the line indicated by the arrows in FIG. 9b. FIG. 9b is a partial cross-sectional lateral representation of the third embodiment. The inner beam and the outer structure are fabricated from an elastomeric material such as butyl rubber with a 50-60 durometer. Inner beam 91 is essentially a rectangle, with a hole 92 through its center, through which cable assembly 6 can be inserted. The outer structure 93 comprises a back section 94 and a front section 95, and walls connecting the back and front sections to inner beam 91. The thickness of the front section is less than the thickness of the back section. A series of slots 96 are cut along the length of the walls of the outer structure between the back section and the inner beam, and between the front section and the inner beam. These slots serve to reduce the stiffness of the neck to side moments. The thicknesses of the front and back sections of the outer structure provide the necessary stiffness for flexion and extension, respectively.

The neck base plate and the neck top of the third preferred embodiment are similar to the neck base and neck top of the second preferred embodiment of the present invention, except that the indentations in the neck base and neck top are shaped to receive the roughly oval-shaped inner beam. The head mounting plate and torsion release swivel joint are similar to the head mounting plate and torsion release swivel joint of the second embodiment.

Figures 10A, 10B, 10C:
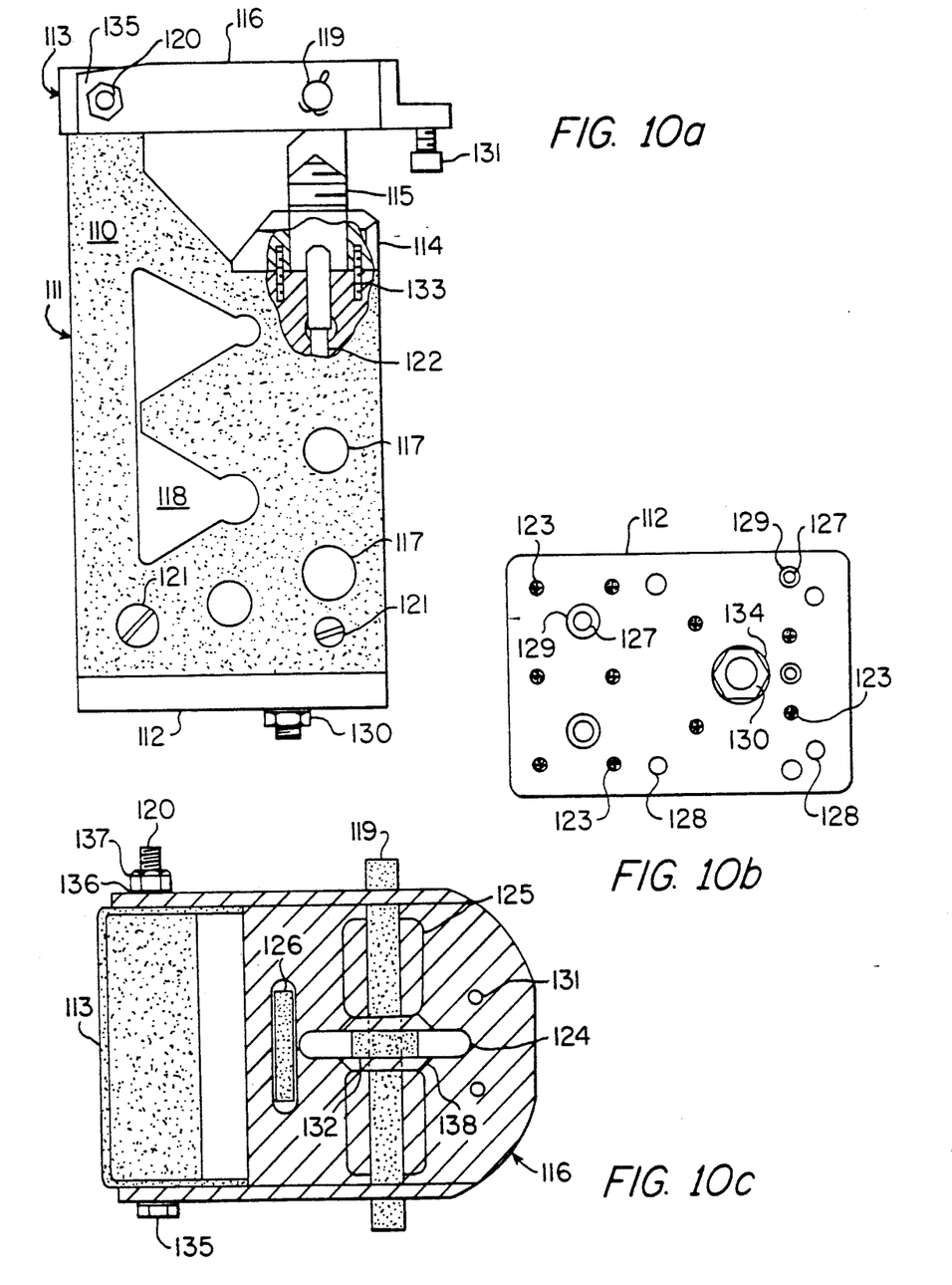
FIG. 10a is a side view of the fourth preferred embodiment of the present invention. A portion is broken away to show internal features thereof.
FIG. 10b is a bottom view of the neck base of the fourth preferred embodiment of the present invention.
FIG. 10c is a top view of the fourth preferred embodiment of the present invention.

A fourth preferred embodiment of the present invention is shown in FIGS. 10a, 10b, and 10c. The fourth preferred embodiment is similar to the second embodiment, but the elastomeric support plate is mounted by a lateral pivot joint in addition to the torsional release swivel joint, and the neck lacks the outer support structure of the previous embodiments.

As shown in FIG. 10a, the fourth embodiment comprises an elastomeric beam 111 made of 50-60 durometer butyl rubber inserted between aluminum neck base 112 and aluminum head support plate 116. Aluminum neck top 114 attaches to elastomeric beam 111 slightly below and forward of head support plate 116. Internal cable assembly 122 is similar to the cable assemblies of the previous embodiments. It connects neck top 114 to neck base 112 and provides neck assembly 110 with axial tensile strength and additional durability.

Unlike the previous embodiments, elastomeric beam 111 has a modified rectangular block configuration. Circular channels 117 and roughly triangular channels 118 have been cut laterally through the sides of elastomeric beam 111. These channels reduce stiffness and help provide the beam with torsion, flexion, and extension characteristics similar to those of the human neck.

FIG. 10b is a bottom view of aluminum neck base 112. Five screws 127 attach neck base 112 to elastomeric beam 111. Screws 127 pass through holes 129 engaging screw anchors 121 which are embedded in elastomeric beam 111, as shown in FIG. 10a. Additional bonding strength is provided by an adhesive applied to the bottom of elastomeric beam 111. Neck base 112 ma also include internal spikes 123 which extend into the elastomeric beam. The bottom of cable assembly 122 is inserted through hole 134 in neck base 112 and is held in position by nut 130. Neck base 112 includes four additional threaded holes 128 to permit attachment of neck assembly 110 to the manikin torso (not shown).

As seen best in FIG. 10a, material is removed from the upper portion of elastomeric beam 111 forming a top surface with an upper plane in the rear sloping down to a lower plane in the front. Aluminum neck top 114 is attached to the top surface of the lower frontal plane. Neck top 114 can also include internal spikes 133 which extend into the elastomeric beam.

Head support plate 116 is attached to neck assembly 110 by torsional release swivel joint 115 in the front and an additional lateral pivot joint 135 in the rear. Torsional release swivel joint 115 is similar to the swivel joint of the second preferred embodiment. It attaches to elastomeric beam 111 by threading into aluminum neck top 114. As shown in FIG. 10c, an upper lug 132 of the torsion release swivel joint fits into head support plate 116 through slot 124. The two parts are held together by inserting pin 119 through upper lug 132. As in the second embodiment, pin 119 is also held in position by tabs 138 and the sides of head support plate 116. Pin 119 also permits attachment of the manikin head (not shown). Pivot joint 135 hingeably connects head support plate 116 to the top of elastomeric beam 111, as shown in FIG. 10a. Pivot joint includes a neck bolt 120 which inserts laterally through elastomeric beam 111, connecting steel reinforcement collar 113 and head support plate 116 to the beam. Neck bolt 120 is secured by washer 136 and nut 137. Reinforcement collar 113 is attached to the lateral and rear surfaces of elastomeric beam 111 in the area of pivot joint 135 to provide local stiffness and wear resistance.

Head support plate 116 is similar to the head support plate of the second embodiment, except that its overall shape is modified. It is a square plate modified to have an essentially round front edge. Two rearward projecting arms are added to either side to help form pivot joint 135. Positioning screws 131 are added to the front to permit adjustment of the manikin head angle. As in the second embodiment of the present invention, snubber 126 and clearance pockets 125 are included to interface with a load cell in the head.

Torsion release swivel joint 115 and pivot joint 135, together with the material properties of elastomeric beam 111, provide torsion, flexion, and extension characteristics which are similar to those of the human neck. They also provide the manikin neck with some forward and backward and side-to-side motion. As with the previous embodiments, the moment applied to the manikin head is a function of the angle between the head and torso.

Tests of the kinematic response of the necks of the present invention have demonstrated that, after having been deformed in a first test, the butyl rubber must be given enough time to return back to its original state before a second test is conducted. Reproducible test results could not be obtained when a second test was performed less than three hours after a first test. Improved reproducibility was obtained when the necks were allowed to rest overnight (about 20 hours) between tests.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A biofidelic manikin neck comprising:
   (a) a subs rectangular elastomeric beam, said beam having:
   (i) a front, a back, a top, two sides, and a bottom;
   (ii) the top of the beam having a flat front portion, at least one sloping portion and a flat back portion, said flat back portion being higher than said flat front portion, and said at least one sloping portion connecting said front portion to said back portion;
  (iii) channels running horizontally from one side of the beam to the other side of the beam;
  (iv) a vertical hole running from the flat front portion of the beam to the bottom of the beam;
 (b) a head support plate, said head support plate being pivotally attached to the top of the flat back portion of the top of the beam;
 (c) a base plate attached to the bottom of the beam; and
 (d) a cable connecting the head support plate to the base plate, said cable running through the vertical hole in the beam.

2. The biofidelic manikin neck of claim 1, wherein at least one of the channels running horizontally from one side of the beam to the other side of the beam is substantially triangular in cross-section.

3. The biofidelic manikin neck of claim 1, wherein at least one of the channels running horizontally from one side of the beam to the other side of the beam is substantially circular in cross-section.

4. The biofidelic manikin neck of claim 1, wherein the base plate comprises internal spikes which extend into the elastomeric beam.

5. The biofidelic manikin neck of claim 1, further comprising a neck top, said neck top being attached to the top of the front portion of the elastomeric beam and to the head support plate.

6. The biofidelic neck of claim 5, said neck top being attached top said front portion of the elastomeric beam with a swivel joint.

7. The biofidelic manikin neck of claim 6, wherein at least one of the channels running horizontally from one side of the beam to the other side of the beam is substantially triangular in cross-section.

8. The biofidelic manikin neck of claim 6, wherein at least one of the channels running horizontally from one side of the beam to the other side of the beam is substantially circular in cross-section.

9. The biofidelic manikin neck of claim 1, wherein two of the channels running horizontally from one side of the beam to the other side of the beam are substantially triangular in cross-section, such triangular cross-sections being oriented such that their bases run vertically and are positioned towards the back of the beam, and their apexes point towards the front of the beam.

10. The biofidelic manikin neck of claim 1, wherein at least one of the channels running horizontally from one side of the beam to the other side of the beam is substantially circular in cross-section, said substantially circular channel being located below the front portion of the top of the beam.

11. The biofidelic manikin beck of claim 1, further comprising a reinforcement collar comprising a metal strip wrapped around the back and the two sides of the elastomeric beam flush with the top of the beam, the top edge of said reinforcement collar being substantially flush with the top of the elastomeric beam.

12. A biofidelic manikin neck comprising:
 (a) a substantially rectangular elastomeric beam having a top, a bottom, a front, a back, and two sides, said elastomeric beam having at least one channel running horizontally from one side of the beam to the other side of the beam, said at least one channel having a triangular cross-section, said triangular cross-section being oriental such that the base of the triangle runs vertically, said elastomeric beam also having a vertical hole running from the top of the beam to the bottom of the beam;
 (b) a head support plate, said head support plate being pivotally attached to the top of the beam;
 (c) a base plate attached to the bottom of the beam; and
 (d) a cable connecting the head support plate to the base plate, said cable running through the vertical hole in the elastomeric beam.

13. The biofidelic manikin neck of claim 12, further comprising a neck top, said neck top being attached to the front of the elastomeric beam and to the head support plate.

14. The biofidelic manikin neck of claim 12, wherein the elastomeric beam also includes at least one circular cross-section channel running from one side of the beam to the other side of the beam.

15. The biofidelic manikin neck of claim 12, wherein further comprising a neck top, said neck top being attached to the top of the elastomeric beam and to the head support plate.

16. The biofidelic neck of claim 12, said neck top being attached to the top of said front portion of the elastomeric beam with a swivel joint.

17. A biofidelic manikin neck comprising:
 (a) a substantially rectangular elastomeric beam having a top, a bottom, a front, a back, and two sides, said top having a back portion and a front portion;
 (b) a head support plate attached to the back portion of the top of the beam with a pivot joint, and attached to the front portion of the top of the beam using a swivel joint;
 (c) a base plate attached to the bottom of the beam; and
 (d) a cable connecting the head support plate to the base plate, said cable running through the vertical hole in the elastomeric beam.

18. The biofidelic manikin neck of claim 17, said elastomeric beam having at least one channel running laterally from one side of the beam to the other side of the beam.

19. The biofidelic manikin neck of claim 17, further comprising a neck top interposed between the front portion of the elastomeric beam and the head support plate, said neck top being attached to the front portion of the elastomeric beam, and said swivel joint being threaded into the neck top.

20. The biofidelic manikin neck of claim 19, wherein the swivel joint is a torsion release swivel joint.

21. The biofidelic manikin neck of claim 17, wherein the head support plate comprises two arms extending to the back of the elastomeric beam, said pivot joint comprising a bolt inserted laterally through the elastomeric beam and the two arms.

22. The biofidelic manikin neck of claim 17, further comprising a reinforcement collar attached to the side and back of the elastomeric beam.

* * * * *

UNITED STATES PATENT AND TRADEMARK OFFICE
CERTIFICATE OF CORRECTION

PATENT NO.   :  5,259,765

DATED        :  November 9, 1993

INVENTOR(S)  :  Marvin K. Richards

It is certified that error appears in the above-identified patent and that said Letters Patent is hereby corrected as shown below:

Column 6, lines 64 and 65 - delete [taken across the line indicated by the arrows in FIG. 9b.]

Column 7, line 55 - delete [ma] and insert --may-- therefor.

Column 8, line 64 - delete [subs] and insert --substantially-- therefor.

Signed and Sealed this

Second Day of August, 1994

BRUCE LEHMAN

*Attest:*

*Attesting Officer*       Commissioner of Patents and Trademarks